United States Patent [19]

Probstmeyer

[11] Patent Number: 5,246,579
[45] Date of Patent: Sep. 21, 1993

[54] SCREEN DEVICE WITH QUICK RELEASE MOUNTING

[75] Inventor: Helmuth Probstmeyer, Bridgeport, Conn.

[73] Assignee: Dorr-Oliver Incorporated, Milford, Conn.

[21] Appl. No.: 914,250

[22] Filed: Jul. 15, 1992

[51] Int. Cl.⁵ .................................... B01D 29/12
[52] U.S. Cl. .......................... 210/232; 210/358; 210/409; 210/411; 210/483; 210/499; 29/163.8; 55/DIG. 31
[58] Field of Search ............... 210/232, 358, 409, 411, 210/483, 499; 29/163.8; 55/DIG. 31

[56] References Cited

U.S. PATENT DOCUMENTS

| | | | |
|---|---|---|---|
| 3,684,091 | 8/1972 | Wehner | 210/499 |
| 3,835,999 | 9/1974 | Moore | |
| 4,113,626 | 9/1978 | Detcher | |
| 4,169,057 | 9/1979 | Gideon | |
| 4,268,382 | 5/1981 | Hanke et al. | 210/499 |
| 4,497,709 | 2/1985 | Nicholson | 210/499 |
| 4,601,737 | 7/1986 | Gerlig | 55/DIG. 31 |
| 4,737,174 | 4/1988 | Pontius | 55/DIG. 31 |
| 4,801,316 | 1/1989 | Schraeder | 55/DIG. 31 |
| 4,892,656 | 1/1990 | Pietzsch | |

Primary Examiner—Robert A. Dawson
Assistant Examiner—W. L. Millard
Attorney, Agent, or Firm—Delio & Peterson

[57] ABSTRACT

A screen assembly for use with a solids-liquid separation screen device that allows for simply replacement or adjustment of the screen assembly. The screen assembly includes an arcuately shaped screen held between pair of side panels. When installed, the screen assembly rest on a ledge formed on the inner walls of the solids-liquid separation device housing. The screen assembly is then securely held in position by a pair of clamps at the top of the screen and by a pair of springs at a lower rear portion of the screen.

10 Claims, 6 Drawing Sheets

SCREEN DEVICE WITH QUICK RELEASE MOUNTING

FIELD OF THE INVENTION

The present invention is directed to a quick release screen assembly for use with dewatering, washing and classification devices that separate solids from liquids in a liquids solid slurry.

BACKGROUND OF THE INVENTION

Dewatering, washing and classification screen devices are well known and comprise screen surfaces mounted in housings to which a liquid-solid slurry is fed for separation of the solids from the liquids on the screen surface. Previous devices include a highly polished concave curved screen surface or deck having an arcuate configuration formed to a configuration of 120° arc segment of a circle. The screen surface is comprised of a plurality of equidistantly spaced, parallel, transverse separating bars having slot openings in the range of 50 to 150 microns formed therebetween. The slurry is fed in a substantially tangential direction to the concave side of the screen surface, at relatively high pressure, through spaced feed nozzles. Oversized material travels around the screen surface and is discharged from the device through an overflow outlet pipe. The liquid portion of the slurry, together with fines, passes through the slots in the screen surface and is discharged through an underflow outlet at the rear of the screen.

These screens have been highly successful in operation and are essentially free from maintenance costs as a result of the simple manner in which the devices function. In particular, the screens are used extensively for high capacity fine separation of fibrous non-abrasive solids in the pulp and paper industry where the screens are used for many process purposes, such as for example, as saveralls or in fiber recovery. Additionally, the screens have found acceptance in the corn wet milling industry, where corn slurries must be separated from the fluid constituents. Although the screens are highly effective, they are subject to wear and must be frequently removed for reversal and replacement.

The design presently on the market utilizes a screen surface held in place inside the dewatering device by the feed nozzles, as well as by an arrangement of retainers and wedges. Once the screen is installed, additional gaskets and caulking must be applied to form a seal between the over and undersized compartments. This process involves the use of approximately twenty four bolts to properly secure the screen. Such an apparatus is shown in U.S. Pat. No. 4,202,777, Schall. All of these steps make the reversal or replacement of the screen surfaces time consuming and difficult. For example, the removal and reversal process takes two mechanics approximately eight hours. Further, since the work must be done inside the screen housing, the presence of noxious vapors and high temperatures aggravates the difficulties.

Numerous attempts have been made to provide a simple and cost effective screen assembly for a screen separation device, but none have fully overcome the difficulties discussed above. To illustrate, U.S. Pat. No. 4,113,626, Detcher, discloses a dewatering screen including a screen assembly that is held in position by a stationary pivot rod and a screw assembly. U.S. Pat. No. 3,835,999, Moore, discloses a dewatering apparatus utilizing a screen that pivots to a non-use position. Other devices include a disintegrating apparatus having an easily removable and replaceable screen assembly as disclosed in U.S. Pat. No. 1,185,620, Blum, as well as a filtering device utilizing spring biasing to properly position the filter as disclosed in U.S. Pat. No. 4,892,656, Pietzsch. Additionally, Gideon discloses a ledge for properly positioning a filter in U.S. Pat. No. 4,169,057.

The instant invention provides a screen assembly for use with solids-liquid separation devices which is simple, convenient, and easy to install and remove. As such, the instant invention overcomes the deficiencies associated with the prior devices and marks a substantial improvement in the usefulness of solids-liquid separation devices.

SUMMARY OF THE INVENTION

The instant invention provides a screen assembly which allows most of the work necessary for the removal and installation of screens from solids-liquid separation devices to be accomplished externally and independently of the screen housing. Consequently, the invention facilitates the replacement of screens in a clean environment and with considerable time saving. The screen assembly includes a screen surface mounted between two side panels. The edges of the screen are seated and sealed in grooves in the side panels so that no further sealing between the over and undersized compartments is required inside the housing. As a result, the screen assembly can be place within the screen housing in its entirety, and fully sealed. The screen assembly is positioned within the housing on ledges machined to the inner surface of the housing. Two clamps at the top of the assembly, and by a pair of springs at the bottom of the screen assembly, hold the assembly in a secure position within the housing.

DETAILED DESCRIPTION OF THE INVENTION

Figure 1:
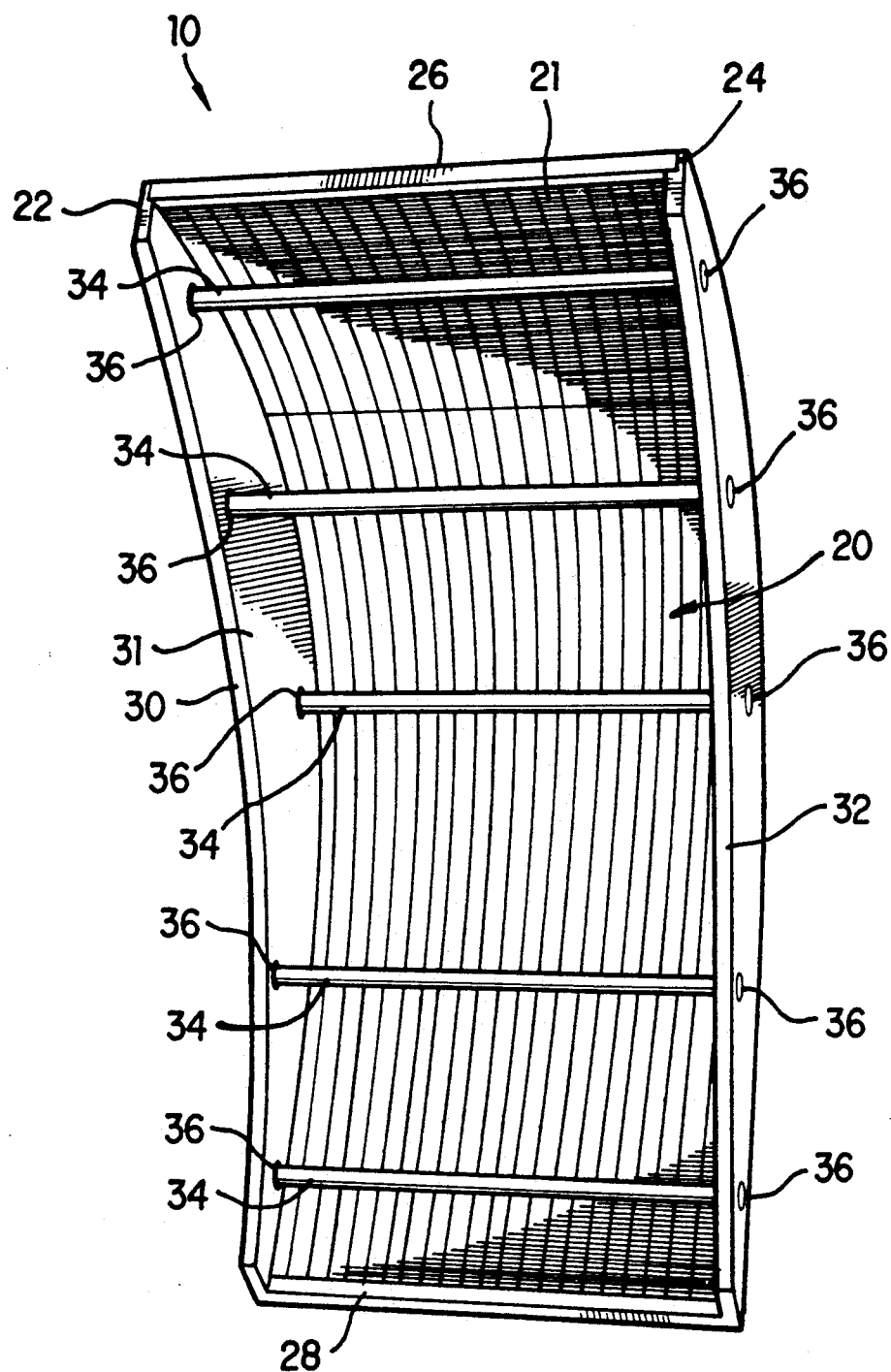
FIG. 1 is a plan view of the screen assembly of the instant invention.

Referring to FIG. 1, the screen assembly 10 generally includes an arcuately shaped screen 20 positioned between a pair of side panels 30 and 32. A plurality of transverse rods 34 positioned between the side panels 30 and 32 further stabilize the screen assembly 10. The transverse rods 34 are secured to the side panels 30 and 32 within holes 36 that are located in the side panels 30 and 32.

Figure 6:
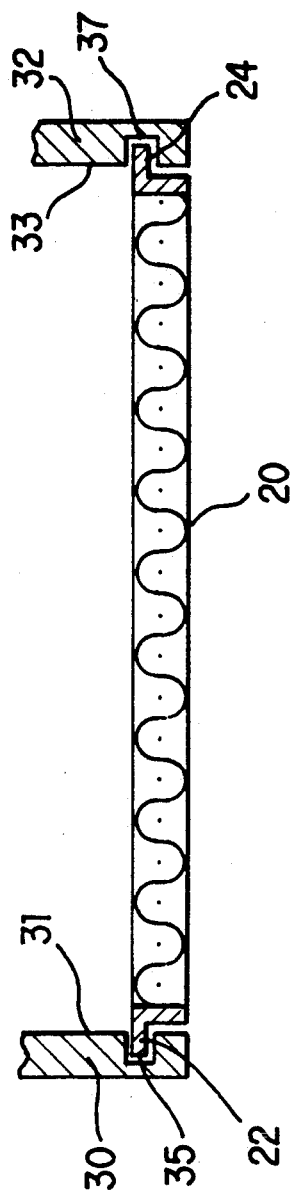
FIG. 6 is a cross-sectional view of the apparatus shown in FIG. 2 showing the screen and slot arrangement.

More specifically, the arcuate screen 20 includes a first arcuately shaped edge 22, a second arcuately shaped edge 24, a top edge 26, and a bottom edge 28. As shown in FIG. 6, the arcuate screen 20 is secured to the side panels 30 and 32 within arcuately shaped slots 35 and 37. The arcuately shaped slots 35 and 37 are located on the inner edges 31 and 33 of the side panels 30 and 32. That is, the first arcuately shaped edge 22 is secured within arcuately shaped slot 35 of side panel 30, and second arcuately shaped edge 24 is secured within arcuately shaped slot 37 of side panel 32. Once the arcuate screen 20 is secured between the side panels 30 and 32, the first and second arcuately shaped edges 22 and 24 are sealed within the arcuately shaped slots 35 and 37. This completely seals the area contained within the side panels 30 and 32, and the arcuate screen 20. That is, the only openings present in the defined area are the openings 21 contained in the screen 20.

Figure 2:
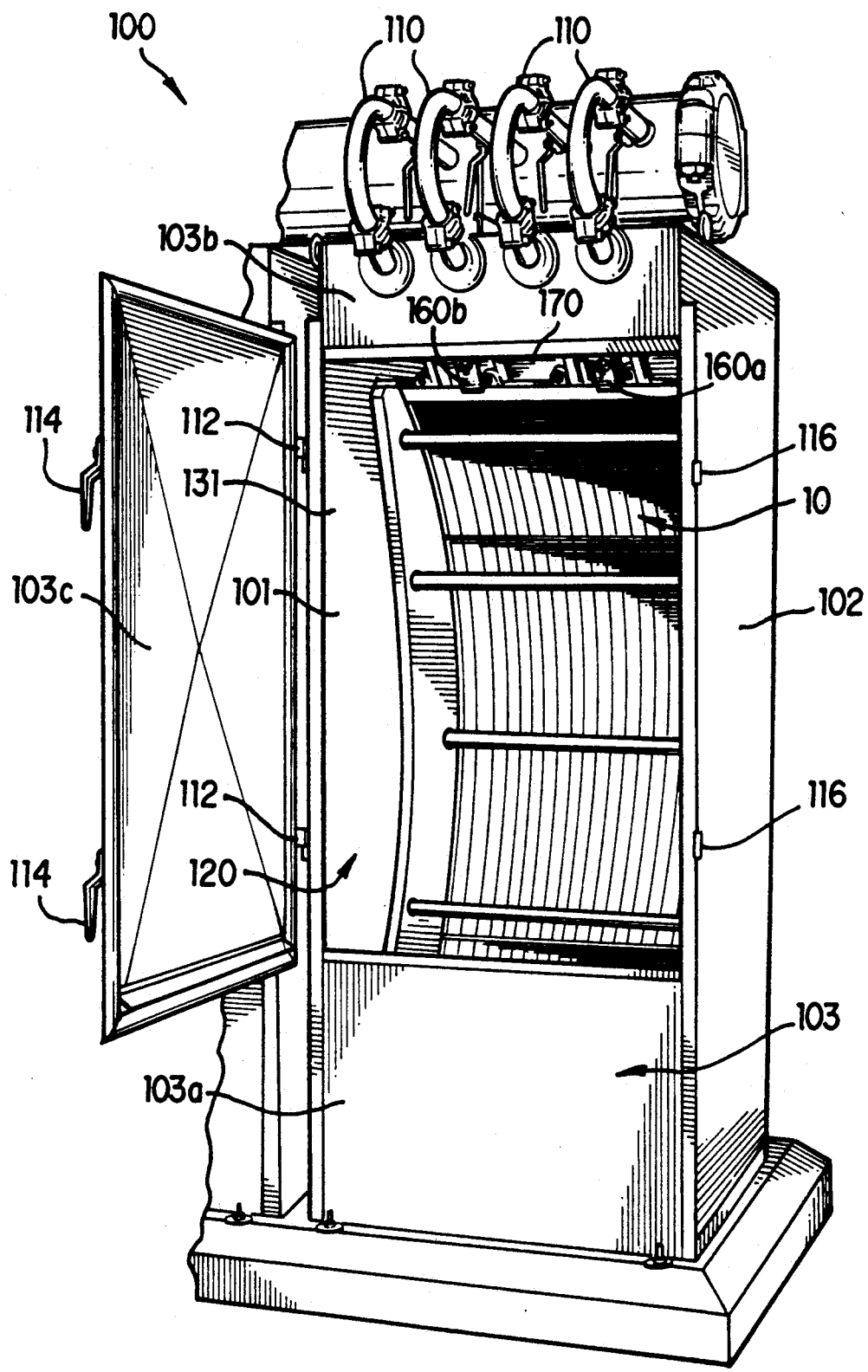
FIG. 2 is a perspective view of the screen assembly 5 housed within a solids-liquid separation screen device.

After the screen assembly 10 has been completely manufactured, it is installed within a screen housing 100 as shown in FIG. 2. The screen housing 100 includes a feed assembly 110 for supplying a liquid-solid slurry to the interior chamber 120 of the housing 100. The housing 100 includes spaced side walls 101 and 102, a front wall 103, a rear wall 104, and a top wall 105. These walls define interior chamber 120. It should be noted that the front wall 103 consists of a lower stationary front wall 103a, an upper stationary front wall 103b, and a centrally located door 103c. The door 103c is pivotally mounted to side wall 101. Hinges 112 pivotally mount the door 103c to provide easy access to the interior chamber 120. The door 103c further includes handles 114 for securely closing the door. Preferably, the handles 114 are pivotally mounted and engage latches 116 to securely close the door 103c.

Figure 3:
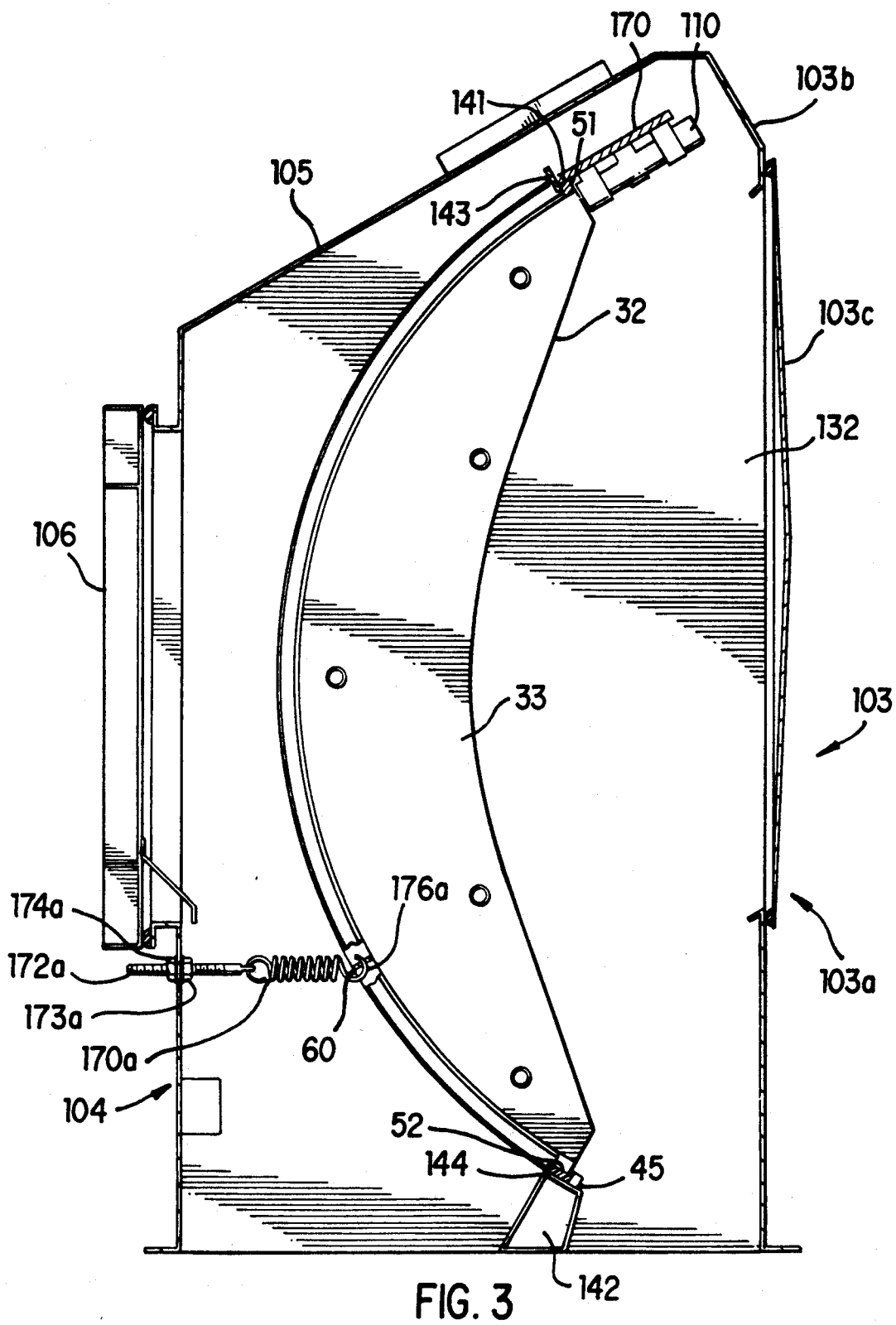
FIG. 3 is a cross sectional view of the apparatus shown in FIG. 2.

As shown in FIGS. 2 and 3, the screen assembly 10 is held within the interior chamber 120 of the screen housing 100. Within the interior chamber 120, the screen assembly 10 rests upon upper ledge 141 and lower ledge 142. Upper ledge 141 and lower edge 142 are secured between the interiors 131 and 132 of side walls 101 and 102, respectively. Upper ledge 141 is positioned at an upper location such that it engages the top edge 26 of the screen 20, while the lower edge 142 is positioned at a lower location to support the bottom edge 28 of screen 20. It should be noted that the upper ledge 141 includes a seal 143 for creating a sealed connection between the top edge 26 and the upper ledge 141. Additionally, lower ledge 142 includes a seal 144 for creating a sealed connection between the lower ledge 142 and the bottom edge 28. The lower ledge 142 also includes a stop 145 which enables the proper positioning of the screen assembly 10. As a result, the rear edge 51 of the top edge 26 and the rear edge 52 of the bottom edge 28 the upper ledge 141 and lower ledge 142 support the rear edge 51 of the top edge 26 and the rear edge 52 of the bottom edge 28, respectively, when the screen assembly 10 is installed within the housing 100.

Figure 4:
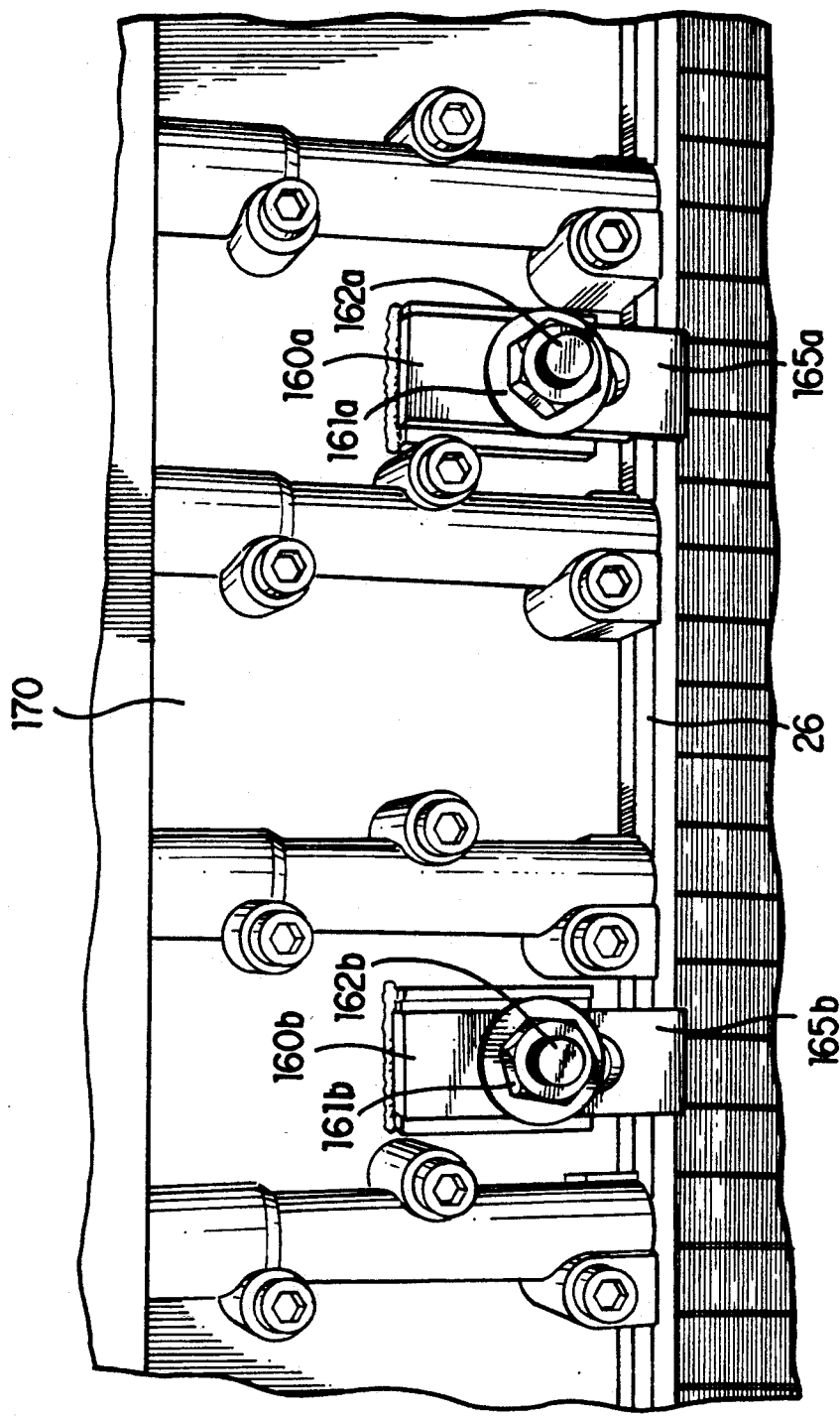
FIG. 4 is a detailed perspective view of the clamp assembly that holds the screen assembly in fixed position.

Once the screen assembly is supported within the interior chamber 120 by the ledges 141 and 142, a pair of clamps 160a and 160b secure the top edge 26 of the screen to the housing 100. As shown in FIGS. 2 and 4, nuts (161a and 161b) and bolts (162a and 162b) hold the clamps 160a and 160b to an interior panel 170 of the housing 100. When the nuts and bolts tighten the clamps 160a and 160b onto the interior panel 170, clamp fingers 165a and 165b securely engage the top edge 26 of the arcuate screen 20 and force the rear edge 51 of top edge 26 into contact with ledge 141.

Figure 5:
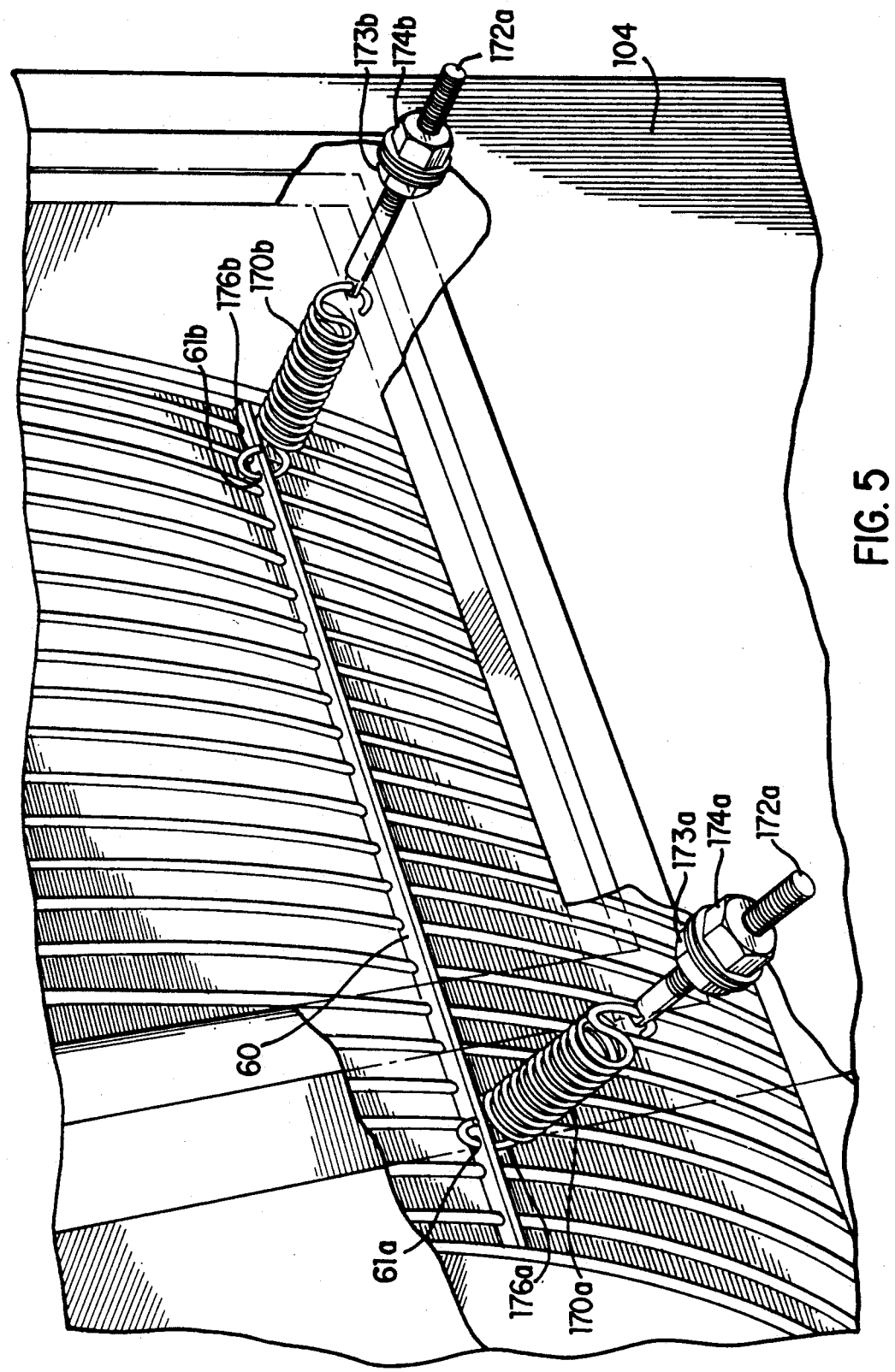
FIG. 5 is a rear perspective view of the apparatus shown in FIG. 2 showing the spring assembly of the instant invention.

The screen assembly is further held in position by a pair of springs 170a and 170b as shown in FIGS. 3 and 5. The springs 170a and 170b extend from the rear wall 104 to a lower rear portion of the screen assembly 10. Preferably eye-bolts 172a and 172b, that are held by internal nuts (173a and 173b) and external nuts (174a and 174b), secure the springs 170a and 170b to the rear wall 104. Further, washers 175 facilitate easier adjustment of the tension on springs 170a and 170b. The springs 170a and 170b are attached to a bracket 60 located at a rear lower portion of the screen 20. A pair of holes 61a and 61b enable the attachment of the springs 170a and 170b to the bracket 60. The holes 60a and 60b are positioned such that the forward loops 176a and 176b of the springs 170a and 170b may pass through the holes. It should be noted that the rear wall 104 is provided with a rear door 106 such that easy access is provided for properly positioning the springs 170a and 170b when the screen assembly 10 is removed and installed. When the springs 170a and 170b are properly positioned and tensioned they act to retain the rear edges 51 and 52 of screen assembly 20 in secure engagement with the ledges 141 and 142.

Although the embodiment disclosed above is the preferred embodiment of the instant invention, it is to be expressly understood that the invention is not limited thereto. Various changes can be made in the design and arrangement of parts without departing from the spirit and scope of the invention as the same will now be understood by those skilled in the art. Consequently, the appended claims should be broadly construed, and should not be limited to their literal terms.

What is claimed is:

1. A screen assembly for use with a solids-liquid separation device comprising:
   an arcuately shaped screen having a first arcuately shaped edge, a second arcuately shaped edge substantially parallel to said first arcuately shaped edge, a top edge, and a bottom edge;
   a first side panel secured to said first arcuately shaped edge and a second side panel secured to said second arcuately shaped edge;
   a pair of clamps for securing the top edge of said screen to the solids-liquid separation device; and
   a pair of springs adapted to be secured between a lower rear portion of said screen and a rear wall of the solids-liquid separation device to hold said screen within the solids-liquid device.

2. A solids-liquid separation device having a readily removable and installable screen assembly comprising:
   a housing, a screen assembly, and means for supplying a liquid-solid slurry to said screen assembly, wherein said housing further includes a pair of side walls between which said screen assembly is removably secured;
   said screen assembly including:
      a screen having a first edge, a second edge substantially parallel to said first edge, a top edge, and a bottom edge;
      a first side panel secured to said first edge and a second side panel secured to said second edge;
   clamp means for securing said screen assembly to said housing; and
   spring means for securing said screen assembly to said housing;
   wherein said clamp means secure the top edge of said screen to said housing, and said spring means are secured between said screen assembly and said housing, such that said screen assembly is removably secured within said housing.

3. A solids-liquid separation device according to claim 2, wherein said spring means is adapted to be secured between a lower rear portion of the screen and a rear wall of said housing.

4. A solids-liquid separation device according to claim 3, wherein said rear wall of said housing includes a door such that the spring means may be easily and readily installed, removed, and adjusted.

5. A solids-liquid separation device according to claim 3, wherein said spring means includes a pair of springs adapted to be secured between a lower rear portion of said screen and a rear wall of said housing.

6. A solids-liquid separation device according to claim 2, wherein said screen is arcuately shaped.

7. A solids-liquid separation device according to claim 6, wherein said first edge is arcuately shaped and said second edge is arcuately shaped.

8. A solids-liquid separation device according to claim 2, wherein said clamp means includes a pair of clamps for securing said top edge of said screen to said solids-liquid separation device.

9. A solids-liquid separation device according to claim 2, wherein said side walls have inner surfaces including ledges shaped to conform with said screen assembly such that a rear portion of said screen assembly is supported by said ledges.

10. A solids-liquid separation device having a readily removable and installable screen assembly comprising:
- a housing, a screen assembly, and means for supplying a liquid slurry to said screen assembly, wherein said housing further includes a pair of side walls between which said screen assembly is removably secured;
- said screen assembly including
  - an arcuately shaped screen having a first arcuately shaped edge, a second arcuately shaped edge substantially parallel to said first arcuately shaped edge, a top edge, and a bottom edge;
  - a first side panel secured to said first arcuately shaped edge and a second side panel secured to said second arcuately shaped edge;
- a pair of clamps for securing said screen assembly to said housing; and
- a pair of springs for securing said screen assembly to said housing;
- wherein said pair of clamps secure the top edge of said screen to said housing, and said pair of springs are secured between said screen assembly and said housing, such that said screen assembly is removably secured within said housing.

* * * * *